United States Patent [19]

Ito

[11] Patent Number: 4,765,700
[45] Date of Patent: Aug. 23, 1988

[54] PUSHER DEVICE FOR PLASTIC OPTICAL FIBER

[75] Inventor: Eiji Ito, Furukawa, Japan

[73] Assignee: Alps Electric Co., Ltd., Japan

[21] Appl. No.: 923,303

[22] Filed: Oct. 27, 1986

[30] Foreign Application Priority Data

Oct. 31, 1985 [JP] Japan .................................. 60-166733

[51] Int. Cl.⁴ ............................ G02B 6/36; G02B 7/26
[52] U.S. Cl. ................................. 350/96.2; 350/96.21
[58] Field of Search ................. 350/96.20, 96.21, 96.22

[56] References Cited

U.S. PATENT DOCUMENTS

| 4,184,740 | 1/1980 | d'Auria et al. ................. 350/96.2 X |
| 4,261,643 | 4/1981 | Stiles et al. .......................... 350/96.2 |
| 4,427,879 | 1/1984 | Becher et al. .................. 350/96.2 X |
| 4,598,975 | 7/1986 | Bussard et al. ................ 350/96.2 X |

FOREIGN PATENT DOCUMENTS 0139493 5/1985 European Pat. Off. ........... 350/96.2

| 0040646 | 3/1979 | Japan .................................. 350/96.2 |
| 0164520 | 9/1984 | Japan .................................. 350/96.2 |
| 0194412 | 10/1985 | Japan .................................. 350/96.2 |
| 1425264 | 2/1986 | United Kingdom ............... 350/96.2 |

Primary Examiner—Stanley D. Miller
Assistant Examiner—David R. Bertelson
Attorney, Agent, or Firm—Guy W. Shoup; Paul J. Winters; Gerard F. Dunne

[57] ABSTRACT

Disclosed herein is a pusher device for a plastic optical fiber comprising a pair of pusher members for holding and fixing end portions of plural plastic optical fibers covered with sheaths, wherein said pusher members have a structure such that the end portions of said plural plastic optical fibers covered with said sheaths are held in plural positions longitudinally spaced away from each other of said optical fibers. With this arrangement, the sheaths are permitted to flex in a space between the two held positions upon bending of the optical fiber cable to thereby absorb difference in curvature.

3 Claims, 3 Drawing Sheets

PUSHER DEVICE FOR PLASTIC OPTICAL FIBER

BACKGROUND OF THE INVENTION

The present invention relates to a pusher device for positioning the ends of plastic optical fibers, and more particularly to a pusher device employable for a multiple-core optical fiber cable incorporating plural plastic optical fibers.

FIG. 3 shows a pusher device employed for a dual-core optical fiber cable in the priot art. As shown in FIG. 3, an optical fiber cable 1 is constituted of two plastic optical fibers 2 and 3 having different flows, sheaths 4 and 5 made of polyethylene, etc. for covering the respective optical fibers 2 and 3, and an outer cover 6 made of polyvinyl chlordie etc. for generally covering the sheats 4 and 5. The sheaths 4 and 5 are exposed at the end portion of the optical fiber cable 1, and are held by a pair of pusher members 8 and 9 of a pusher device 7 at a predetermined position to enhance a frictional force between the optical fiber 2 and the sheath 4 and a frictional force between the optical fiber 3 and the sheath 5, thus positioning the ends of the optical fibers 2 and 3. The optical fibers 2 and 3 are projected from the end surfaces of the sheaths 4 and 5 by a predetermined amount. The end surfaces 2a and 3a of the optical fibers 2 and 3 are arranged in opposed relation with an optical connector (not shown) so as to transmit an optical signal.

However, the conventional pusher device 7 is designed such that each of the sheaths 4 and 5 is held in a single position, and when a clamping force of the pusher members 8 and 9 is increased so as to securely prevent slip of the optical fibers 2 and 3 relative to the sheaths 4 and 5, local stress concentration is generated to remarkably reduce light transmittance of the optical fibers 2 and 3. To cope with this problem, the clamping force of the pusher members 8 and 9 must be supporessed to some degree, but in this case, the end portions of the optical fibers 2 and 3 are liable to slip in the sheaths 4 and 5. As a result, when the optical fiber 1 is bent near the end portion thereof as shown in FIG. 3, the end surfaces 2a and 3a of both the optical fibers 2 and 3 are slipped from a predetermined position because of difference in curvature. For example, the end surface 2a of the optical fiber 2 on the side of smaller curvature in FIG. 3 is projected from the predetermined position, and is brought into abutment against the optical connector (not shown) to cause a serious accident such as damage of the end surfaces.

SUMMARY OF THE INVENTION

Accordingly, it is an object of the present invention to provide a pusher device for a plastic optical fiber which may securely prevent slip of the plural plastic optical fibers relative to the sheaths and maintain good light transmittance.

According to the present invention, there is provided a pusher device for a plastic optical fiber comprising a pair of pusher members for holding and fixing end portions of plural plastic optical fibers covered with sheaths, wherein said pusher members have a structure such that the end portions of said plural plastic optical fibers covered with said sheaths are held in plural positions longitudinally spaced away from each other of said optical fibers.

With this arrangement, local stress concentration is hardly generated in the optical fibers to thereby maintain good light transmittance. Moreover, a contact area between the sheaths and the pusher members is increased to thereby effectively prevent slip of the optical fibers. Additionally, when the optical fiber cable is bent near the end portion thereof, the sheaths are flexed between the sandwiched or held portions to absorb difference in curvature. Therefore, the slip of the end surfaces of the optical fibers may be more securely prevented.

Other objects and features of the invention will be more fully understood from the following detailed description and appended claims when taken with the accompanying drawings.

DETAILED DESCRIPTION OF THE PREFERRED EMBODIMENTS

Figure 1:
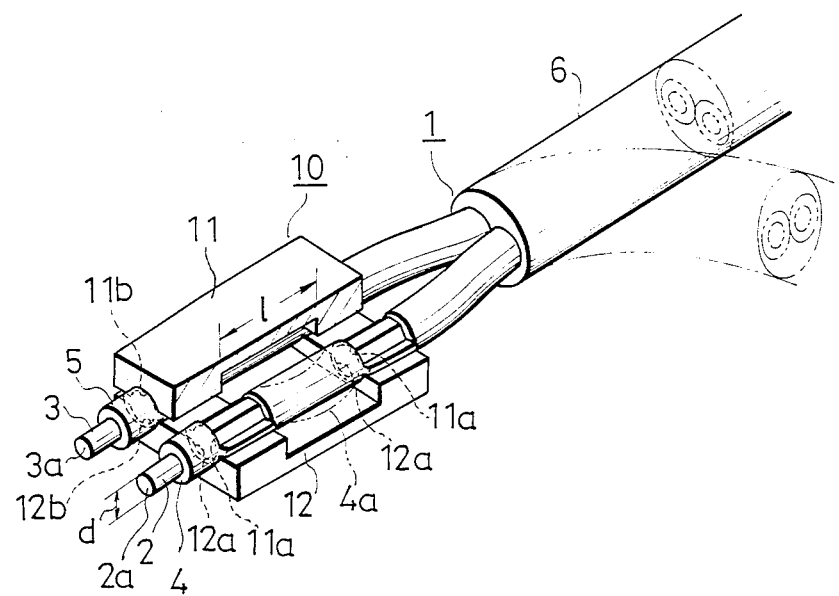
FIG. 1 is a perspective view of an essential part of a preferred embodiment according to the present invention.
Figure 3:
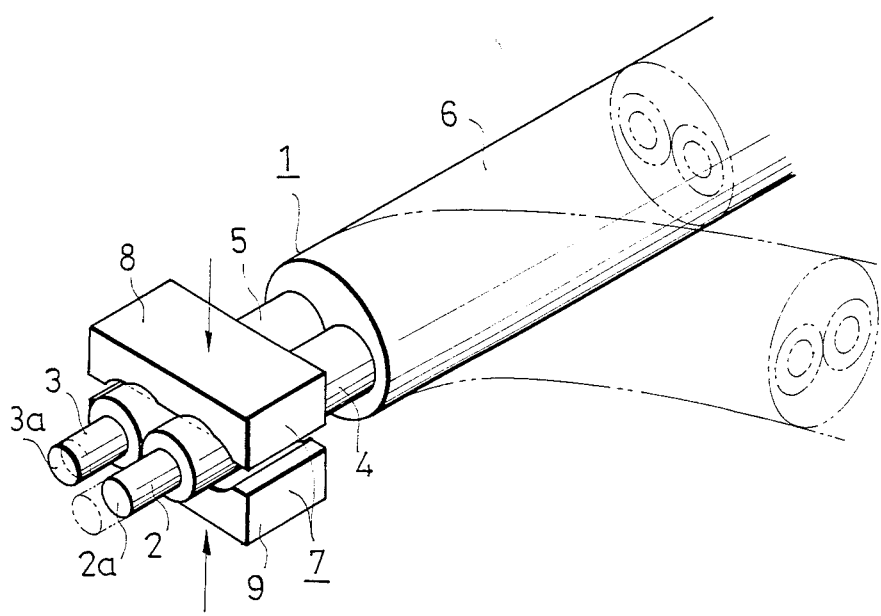
FIG. 3 is a perspective view of the pusher device in the prior art.

Referring to FIG. 1 which shows a preferred embodiment of the present invention, a pusher device 10 is constituted of a pair of pusher members 11 and 12. Like parts as in FIG. 3 are designated by the same reference numerals.

As shown in FIG. 1, the pair of pusher members 11 and 12 of the pusher device 10 are provided with channel-like pushing portions 11a, 11b, 12a and 12b, respectively. That is to say, the pusher member 11 is provided with two channel-like pushing portions 11a and two channel-like pushing portions 11b. The pusher member 12 is also similarly constructed. The end portion of a sheath 4 covering the optical fiber 2 is sandwiched by the two pairs of channel-like pushing portions 11a and 12a at two distant positions. Similarly, the end portion of the sheath 5 covering the optical fiber 3 is sandwiched by the two pairs of channel-like pushing portions 11b and 12b at two distant positions. Namely, although the pusher member 11 is partially omitted for the purpose of avoiding complication of the drawing, the pusher member 11 is formed with the two channel-like pushing portions 11a abutting against the sheath 4 at the two positions longitudinally spaced away from each other by a predetermined distance, and is also formed with the two channel-like pushing portions 11b abutting against the sheath 5 at the two positions longitudinally spaced away from each other by the predetermined distance. In the same manner, the pusher member 12 is formed with the two channel-like pushing portions 12a abutting against the sheath 4 and the two channel-like pushing portions 12b abutting against the sheath 5. The pair of pusher members 11 and 12 are arranged in opposed relation with each other, and are clamped to hold the sheath 4 at the two distant positions by the channel-like pushing portions 11a and 12a, and also hold the sheath 5 at the two distant positions by the channel-like pushing portions 11b and 12b. The distance l between the two pairs of channel-like pushing portions 11a and 12a sandwiching the sheath 4 is set to a little less than five times or more the diameter d of the optical fiber 2. Similarly, the distance l between two pairs of channel-like pushing portions 11*b* and 12*b* sandwiching the sheath 5 is set to a little less than five times or more the diameter of the optical fiber 3. The diameter of the optical fiber 2 is usually equal to that of the optical fiber 3, and the diameter d is 1 mm in the preferred embodiment.

In this manner, as the end portions of the sheaths 4 and 5 covering the optical fibers 2 and 3 are held in the two positions longitudinally spaced away from each other by the predetermined distance, stress is dispersed, and local stress concentration is not generally in the optical fiber 2 or 3. Accordingly, even when the clamping force of the pusher members 11 and 12 is increased, light transmittance is not so reduced. Further, since a contact area between the pusher members 11 and 12 and the sheaths 4 and 5 is large, slip of the optical fibers 2 and 3 relative to the sheaths 4 and 5 may be effectively prevented. Furthermore, when the optical fiber cable 1 is bent in such a manner as shown in FIG. 1, the sheath 4 on the side of smaller curvature in FIG. 1 is allowed to flex in a space between the two held portions since the sheaths 4 and 5 are held in the two positions longitudinally spaced away from each other by the predetermined distance. As a result, the flexure of the sheath 4 (as designated by reference numeral 4*a* in FIG. 1) acts to absorb difference in curvature to suppress slip of the end surfaces 2*a* and 3*a* of the optical fibers 2 and 3 due to the bending.

Figure 2:
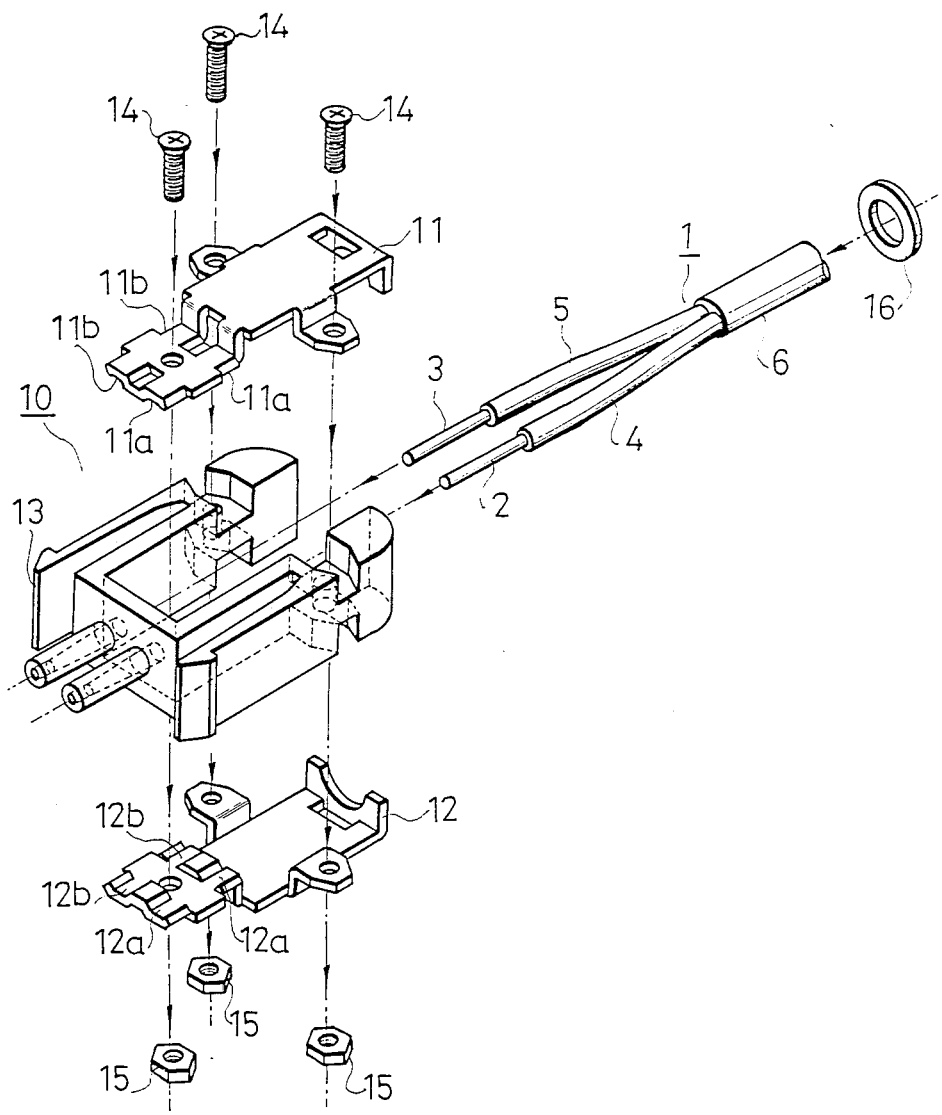
FIG. 2 is an exploded perspective view of a pusher device in another preferred embodiment according to the present invention.

FIG. 2 is an exploded perspective view of the pusher device in another preferred embodiment of the present invention, in which the corresponding parts in FIG. 1 are designated by the same reference numerals. Referring to FIG. 2, there are provided a plug 13 made of synthetic resin, clamping screws 14 and clamping nuts 15. A pair of pusher members 11 and 12 formed of a metal plate are designed to hold the end portions of the sheaths 4 and 5 made of polyethylene at the two positions, and are fixed to the plug 13. An annular fixing member 16 made of metal is engaged with the end portion of an outer cover 6 made of polyvinyl chloride which generally covers both the sheaths 4 and 5 of the optical fiber cable 1 so as to fix the sheaths 4 and 5 to the outer cover 6.

While the invention has been described with reference to specific embodiments, the descriptions is illustrative and is not to be construed as limiting the scope of the invention. Various modifications and changes may occur to those skilled in the art without departing from the spirit and scope of the invention as defined by the appended claims.

What is claimed is:

1. In a pusher device for holding a pair of optical fibers of an optical fiber cable in parallel alignment with a longitudinal axis, the optical fibers having covering sheaths made of a plastic material which are exposed from the optical fiber cable in a holding region of said pusher device, the improvement wherein said pusher device comprises a pair of opposing pusher members having respective holding surfaces facing each other which are clamped toward each other but spaced apart a slight distance from each other so as to allow pressure to be applied to said pusher members to hold the optical fibers covered in their sheaths therebetween in parallel alignment, each of said holding surfaces having formed therein a pair of channel-like pushing portions in which the respective optical fibers in their sheaths are held in close contact, said channel-like pushing portions being formed as a pair of spaced apart, separate grooves extending in parallel with said longitudinal axis and being recessed in said holding surface, each having an inner wall surface which is contoured in cross section corresponding partially to the cross section of the respective optical fibers in their sheaths, and wherein each of said channel-like pushing portions is formed with two parts which abut the respective optical fiber in its sheath at two positions longitudinally spaced apart by a predetermined distance therebetween, whereby the pusher members hold the optical fibers in two positions longitudinally spaced apart to disperse stress on the optical fibers, the optical fibers are allowed to absorb flexing by the space of said predetermined distance between the two holding positions, and slippage of or damage to the optical fibers is avoided.

2. A pusher device for a plastic optical fiber according to claim 1, said fiber including a covering sheath and an end portion, said pusher device further comprising a plug made of synthetic resin, clamping screws, clamping nuts, said pair of pusher members formed of a metal plate for holding said sheath by a predetermined clamping force of said clamping screws and said clamping nuts, said pusher members being fixed to said plug.

3. A pusher device according to claim 1, wherein the distance between said two positions is set to a little less than five times or more the diameter of said optical fibers.

* * * * *